United States Patent [19]

Utsunomiya et al.

[11] 4,402,545
[45] Sep. 6, 1983

[54] STIFFENED AUTOMOBILE BODY STRUCTURE

[75] Inventors: Naomasa Utsunomiya; Yoshimitsu Tanaka, both of Hiroshima, Japan

[73] Assignee: Toyo Kogyo Co., Ltd., Hiroshima, Japan

[21] Appl. No.: 237,660

[22] Filed: Feb. 24, 1981

[30] Foreign Application Priority Data

Feb. 27, 1980 [JP] Japan .................................. 55-24602

[51] Int. Cl.³ ............................................ B62D 25/20
[52] U.S. Cl. ................................................. 296/204
[58] Field of Search ................. 296/191, 204, 208, 209

[56] References Cited

U.S. PATENT DOCUMENTS

| | | | |
|---|---|---|---|
| 2,111,563 | 3/1938 | Kliesrath | 296/204 |
| 2,788,223 | 4/1957 | Mersheimer | 296/204 |
| 2,856,226 | 10/1958 | Purdy | 296/204 |
| 3,002,782 | 10/1961 | Jahn | 296/204 |
| 4,294,467 | 10/1981 | Frantom | 280/801 |

Primary Examiner—Robert R. Song
Attorney, Agent, or Firm—Fleit, Jacobson & Cohn

[57] ABSTRACT

An automobile body panel having a pair of longitudinal rigid structural members and a pair of transverse rigid structural members at the peripheries thereof to define a panel section. The panel section is formed with a group of longitudinal beads extending from one of the transverse structural members toward the central portion of the panel and a group of transverse beads extending from one of the longitudinal structural members. The structure is effective to prevent resonant vibrations of the panel when the engine is in operation.

7 Claims, 9 Drawing Figures

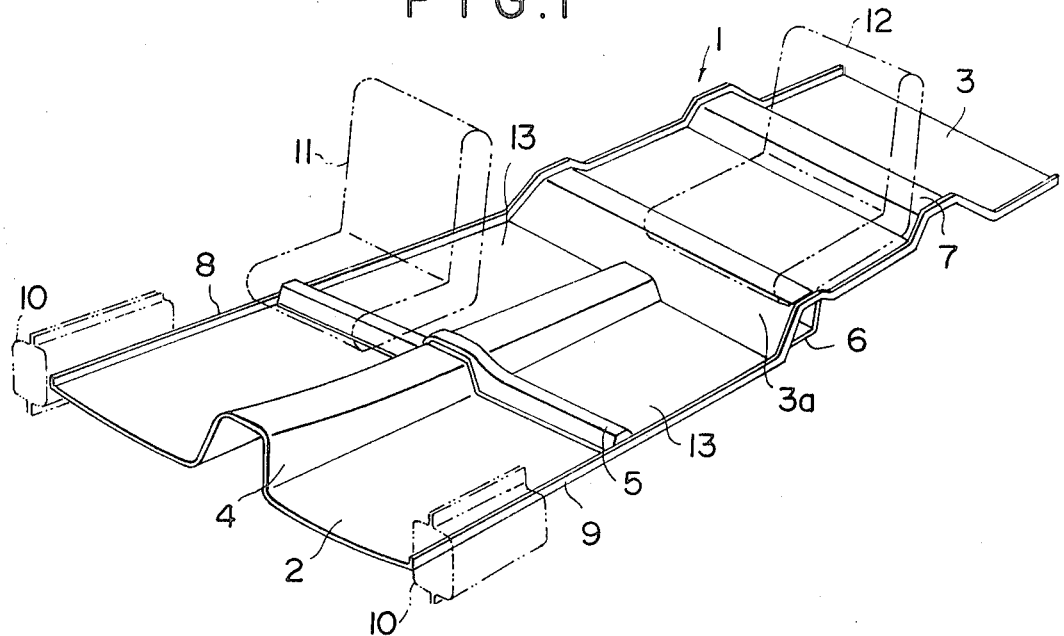
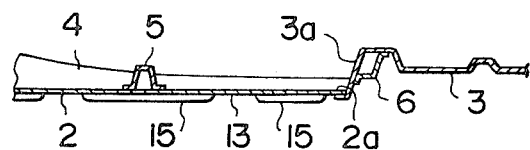
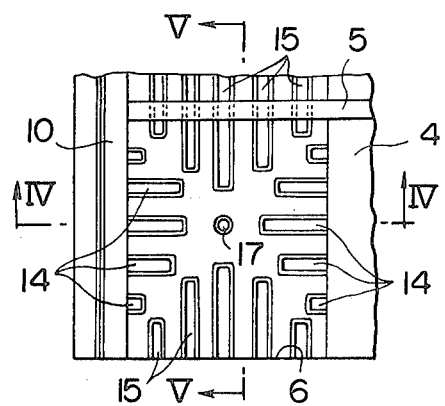

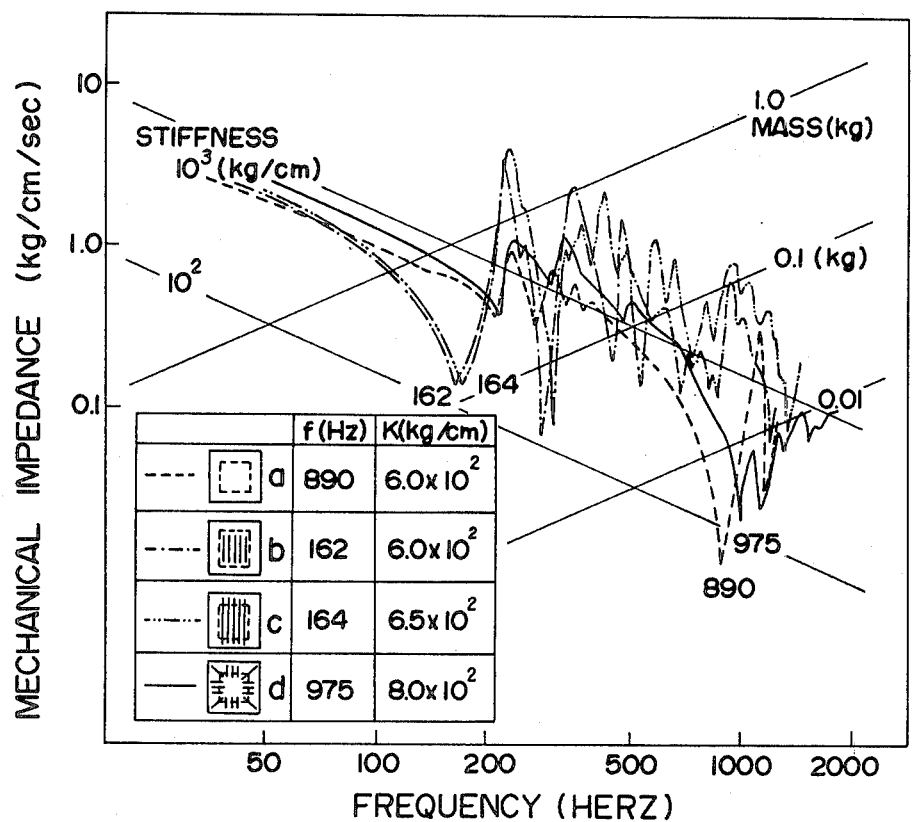

STIFFENED AUTOMOBILE BODY STRUCTURE

The present invention relates to automobile body panel structures and more particularly to automobile body panels surrounded by rigid structural members.

In general, automobile body panels such as floor panels have along their peripheries rigid structures such as frames, side sills, floor tunnels and the like, so that the panels are apt to be subjected to vibrations. Thus, when the engine is being in operation, the panels often produce resonant vibrations which are transmitted to other body panels and cause unpleasant stuffed noises in the car body. Such stuffed noises may effectively be decreased by stiffening the body panels to provide higher rigidities and increased resonant frequencies. For the purpose, conventional floor panels have been formed with beads which generally extend parallelly with the side sills and the floor tunnel. Alternatively or together with such beads, the floor panels have been drawn or pressed to provide generally curved contours. It has been recognized, however, that the conventional structures have not been satisfactory to accomplish the intended results. Particularly, in the structure having the aforementioned beads, the panels are stiffened only in the longitudinal direction to thereby result in directional properties of the rigidities.

It is therefore an object of the present invention to provide an automobile body panel having a satisfactory rigidity so that the resonant vibrations of the panel can effectively be prevented.

Another object of the present invention is to provide an automobile body panel which is stiffened in substantially all directions.

According to the present invention, the above and other objects of the present invention can be accomplished by an automobile body panel having a central portion and surrounding peripheries provided with rigid structures, said panel being of a curved configuration and formed with a first group of parallel beads extending substantially from at least one of said rigid structures toward said central portion of the panel and a second group of parallel beads substantially perpendicular to said first group of beads and extending substantially from at least one of the other of the rigid structures toward said central portion of the panel. The present invention can effectively applied to a floor panel structure of an automobile body which is surrounded by longitudinal rigid structures comprised of a side sill and a floor tunnel, and transverse rigid structures comprised of transverse frame members. The first group of beads may then extend longitudinally and preferably through one or both of the transverse frame members. The panel may further include diagonally extending beads so that it be stiffened even in diagonal directions.

The above and other objects and features of the present invention will become apparent from the following descriptions of preferred embodiments taking reference to the accompanying drawings, in which:

FIG. 1 is a perspective view of an automobile floor structure to which the present invention can be applied;

FIG. 2 is a longitudinal sectional view of the floor structure shown in FIG. 1;

FIG. 3 is a plan view of a floor panel section in accordance with one embodiment of the present invention;

FIG. 9 is a diagram showing the effect of the present invention.

Figure 4:
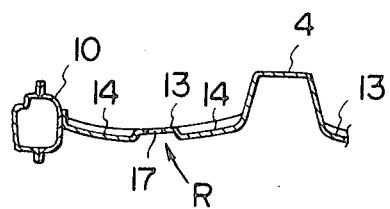
FIG. 4 is a sectional view taken along the line IV—IV in FIG. 3.

Referring now to the drawings, particularly to FIGS. 1 and 2, there is shown a floor structure 1 comprised of a front panel 2 and a rear panel 3. The front panel 2 has a rear edge portion 2a connected in an overlapping relationship with the front end portion 3a of the rear panel 3 which is bent obliquely downwardly and formed with a connecting flange at the front edge thereof. The front panel 2 is formed at the central portion with a floor tunnel 4 which extends longitudinally to the rear edge portion 2a thereof. In the longitudinally intermediate portion of the front panel 2, there is a transversely extending frame member 5 which overlies the panel 2 throughout the width thereof and is welded thereto to provide a transverse rigid structure. Behind the front end portion 3a of the panel 3, there is provided a transversely extending frame member 6 which has opposite edges welded to the rear panel 3 to provide a second transverse rigid structure. The rear panel 3 is also formed with a transversely extending frame 7. Along the opposite side edges 8 and 9 of the front panel 2, there are provided side sills 10 of a substantially rigid nature. These side sills 10 are welded respectively to the side edges 8 and 9 of the front panel 2 substantially throughout the lengths thereof. It should therefore be understood that, in the front panel 2, there are defined panel sections 13 each surrounded by the floor tunnel 4, the transverse frames 5 and 6, and the side sill 10. On the front and rear panels 2 and 3, there are positioned passenger seats 11 and 12, respectively.

Figure 5:
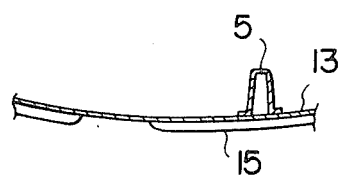
FIG. 5 is a sectional view taken along the line V—V in FIG. 3.
Figure 6:
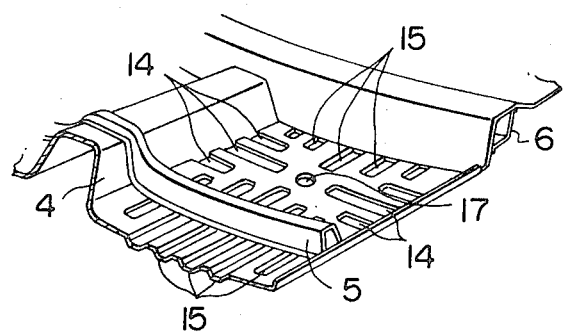
FIG. 6 is a perspective view of the panel section shown in FIG. 3.

Referring now to FIGS. 3 through 6, the panel section 13 is of a generally curved configuration as shown in FIGS. 4 and 5. At the center of the panel section 13, there is formed a water drain hole 17. The panel section 13 is formed with a first group of parallel beads 15 which are in the form of recessed straight grooves extending longitudinally either from the transverse frame 5 or from the transverse frame 6 toward the central portion of the panel section 13. In the illustrated embodiment, the beads 15 extend through the transverse frame 5 to the adjacent panel section. This arrangement is preferable because the panel is stiffened even at the area adjacent to the junction with the frame 5. The panel 2 is also formed with a second group of parallel beads 14 which are also in the form of recessed straight grooves extending transversely either from the side edge adjacent to the side sill 10 or from the floor tunnel 4 toward the central portion of the panel section 13. The beads 14 and 15 of the first and second group terminate in the panel section 13 so that they do not cross with each other.

Figure 7:
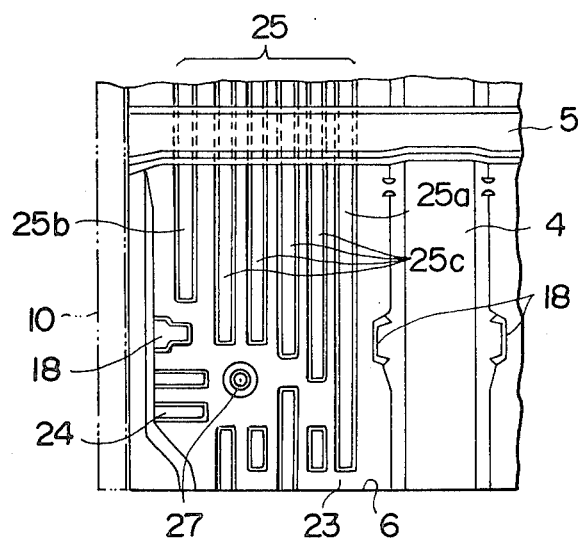
FIGS. 7 and 8 are plan views respectively showing other embodiments of the present invention.

Referring to FIG. 7, there is shown another embodiment of the present invention wherein the floor panel section 23 has a first group of longitudinally extending beads 25 and a second group of transversely extending beads 24. In this embodiment, the first group 25 includes an inboardmost bead 25a which extends along the floor tunnel 4 from the transverse frame member 5 and terminates at a position close to the frame 6. The outboardmost bead 25b in turn terminates at a portion close to a fitting pedestal 18 formed in the panel 2 for attaching a seat belt. The other beads 25c are divided at intermediate portions to provide a smooth area wherein a water drain hole 27 is formed. The second group 24 includes only two transverse beads which are located between the side sill 10 and the drain hole 27. The floor tunnel 4 is formed at the opposite sides with fitting pedestals 18 for attaching seat belts.

Figure 8:
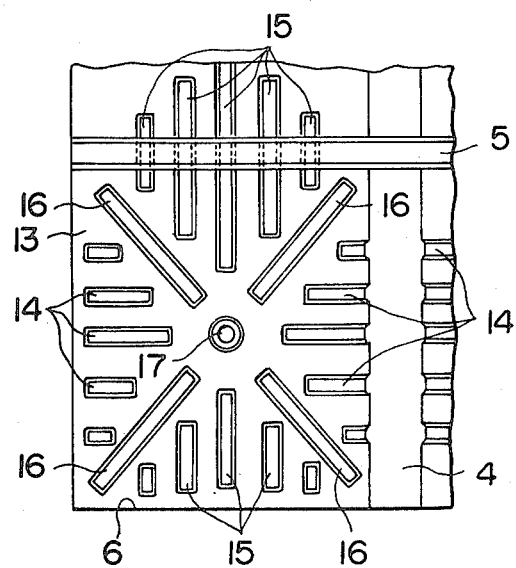

FIG. 8 shows a modification of the embodiment shown in FIGS. 3 to 6. In this embodiment, diagonally extending beads 16 are formed between the first and second groups of beads 15 and 14. This arrangement is effective to provide an additional rigidity in the diagonal directions. Further, in this arrangement, the beads 14 do not start exactly from the side edge of the panel 2 but the outboard ends of the beads 14 are slightly spaced from the side edge of the panel 2. Similarly, the longitudinal beads 15 are slightly spaced from the transverse frame 6.

EXAMPLE

In order to ascertain the advantageous effect of the present invention, the following specimens have been prepared. In the specimens, each bead was 30 mm wide and 8 mm deep.

| SPECIMEN | CONFIGURATION |
|---|---|
| a | CURVED PANEL SECTION |
| b | CURVED PANEL SECTION WITH FIVE LONGITUDINAL BEADS NOT BRIDGING TO THE RIGID FRAMES |
| c | CURVED PANEL SECTION WITH FIVE LONGITUDINAL BEADS BRIDGING TO THE RIGID FRAMES |
| d | CURVED PANEL SECTION WITH LONGITUDINAL AND TRANSVERSE BEADS AS WELL AS DIAGONAL BEADS, ALL BRIDGING TO THE RIGID FRAMES |

The specimens a, b, c and d have been subjected to vibration tests to determine the mechanical impedance at the centers of the panels. The results are shown in FIG. 9. It will be noted in FIG. 9 that the specimen d has the highest resonating frequency f herz and the highest equivalent spring coefficient K (kg/cm). Thus, it will be understood that the panel section formed in accordance with the present invention is effective to prevent resonant vibrations.

The invention has thus been shown and described with reference to specific embodiments, however, it will be noted that the invention is in no way limited to the details of the illustrated structures but changes and modifications may be made without departing from the scope of the appended claims.

We claim:

1. An automobile floor panel structure including a plurality of panel sections each having a central portion and surrounding peripheries provided with rigid structures, said panel section being of a curved configuration and formed with a first group of parallel beads extending substantially from at least one of said rigid structures toward said central portion of the panel and a second group of parallel beads substantially perpendicular to said first group of beads and extending substantially from at least one of the other of the rigid structures toward said central portion of the panel, said panel section being surrounded by longitudinal rigid structures including a side sill and a floor tunnel and transverse rigid structures including a central transverse frame member and one of a front and rear transverse frame members, at least one of said transverse frame members being laid on the panel section, said beads being in the form of recessed straight grooves, at least one of the first group of beads extending longitudinally through said central transverse frame member to another panel section in which said first and second groups of beads do not intersect with each other, and said panel section includes a central drain hole means.

2. An automobile body panel structure in accordance with claim 1 in which diagonally extending beads are formed between said first and second group of beads.

3. An automobile floor panel structure in accordance with claim 1 in which said transverse frame members are connected with the panel sections to form rigid structures of closed cross section.

4. An automobile floor structure in accordance with claim 1 in which said first group of beads is formed with uniform spacings therebetween.

5. An automobile floor panel structure in accordance with claim 1 in which said first group of beads is larger in number than said second group of beads.

6. An automobile floor panel structure in accordance with claim 1 in which one of said first group of beads is formed along said floor tunnel and extends from one panel section through said central transverse frame member to another panel section.

7. An automobile floor panel structure in accordance with claim 6 which includes fitting pedestal means for attaching seat belt means in the vicinity of the side sill.

* * * * *